Patented June 25, 1935

2,005,902

UNITED STATES PATENT OFFICE 2,005,902

WELDING ELECTRODES

David L. Mathias, Pittsburgh, Pa., assignor to Westinghouse Electric & Manufacturing Company, East Pittsburgh, Pa., a corporation of Pennsylvania No Drawing. Application September 30, 1932, Serial No. 635,609

2 Claims. (Cl. 219—8)

My invention relates, generally, to electric welding and it has particular relation to metallic electrodes used for performing arc welding operations.

It is customary in the manufacture of wires or rods, which are used as the base for making welding electrodes either of the uncoated type or of the coated or fluxed type, to draw the wires or rods from large rods which have been rolled to such shape in a steel rolling mill. Prior to the drawing operation, the mill scale and other extraneous matter are removed from the surface of the large rods by pickling them in an acid bath. In order to counter-act the effects of the pickling bath and to provide a lubricant on the surface of the rods so that they may be easily drawn through the dies of the drawing mill without undue wear thereof, the rods are dipped in a lime bath. The lime coating, thus provided, serves to neutralize the effects of the acid bath of the pickling process and furnishes a relatively smooth and slippery surface thereby reducing to a considerable extent the wear on the dies of the drawing mill.

When the wires or rods have been drawn to the desired size, they are usually reeled into rolls and are supplied for use in this form without further processing or they are coated with any of the various well known flux coatings which may be used for stabilizing the operation of the welding arc. The wires or rods, when finally drawn, may alternatively be cut into short lengths for use in customary manual welding procedure either in the uncoated or the coated form.

After considerable experimentation in the laboratory I have found that the wire supplied from the drawing mill in the manner hereinbefore described is not uniform and, as a result, it is difficult to use the electrodes for performing the welding operation. This difficulty particularly arises in the use of the coated or fluxed electrodes for the reason that the pickling and liming steps in the process of manufacture of the base wires or rods introduce variable factors for which it is difficult to compensate. Thus, regarding the pickling process, the concentration and temperature of the acid bath, the character of the inhibitor used, the length of time during which the rods are subjected to the pickling bath, the thickness of the scale on the rods, the character of other extraneous matter on the rods, and the composition of the rods themselves all serve to affect the ultimate character of the welding electrodes as supplied for commercial use. While the liming process materially reduces the deleterious effects of the pickling operation, it is usually found that some of its effects may still be present in the finished electrode. In addition, some of the lime coating is usually present in the finished electrode together with an oxide coating or film which serves to hold the lime deposit on the rod.

I have found that the effects of the pickling operation remaining in the finished electrode tend to produce a high melting rate of the electrode together with an erratic arc action and that the resulting weld is porous and the penetration of the weld metal is relatively low. I have found also that the effects of the liming operation remaining in the finished electrode tend to produce a low melting rate of the electrode with a quiet arc action and a resulting sound non-porous weld having a relatively high penetration of the weld metal. Consequently, it is apparent that it is desirable to obtain a base or core for a welding electrode that is entirely free from the effects of the pickling and liming operations so that its welding characteristics may be accurately controlled by the various fluxes that may be applied to its surface.

It is, therefore, an object of my invention, generally stated, to provide a welding electrode that shall be quiet and efficient in operation and readily and economically manufactured and used.

The principal object of my invention is to provide for eliminating the variable factors in the manufacture of metallic welding wires or rods.

A more specific object of my invention is to provide for removing the deleterious effects of the pickling, liming and drawing processes which are used in the manufacture of welding electrodes.

A further object of my invention is to provide for thermally removing the effects of the pickling operation on wires or rods used in the manufacture of welding electrodes.

A still further object of my invention is to provide for mechanically removing the combined lime and oxide coating that remains on the surface of wires or rods used in the manufacture of welding electrodes.

Another object of my invention is to provide for irregularly roughening the entire surface of wires or rods used in the manufacture of welding electrodes to permit the ready adhesion thereto of a welding flux.

Other objects of my invention will, in part, be obvious, and in part, appear hereinafter.

My invention, accordingly, is disclosed in the embodiment thereof described in the following specification, and comprises the features of construction and methods of manufacture which will be exemplified in the description hereinafter set forth, and the scope of the application of which will be indicated in the appended claims.

As set forth hereinbefore, certain of the effects of the pickling operation to which the wires or rods are subjected are undesirable and introduce variable factors into the wires or rods for which it is difficult to compensate. I have found that all of these effects may be completely eliminated by subjecting the wires or rods after the final drawing operation to a relatively high temperature in which the drawn wires or rods are annealed. I have found that it is desirable to subject the drawn wires or rods to a temperature of 1600° F. for a period of 5 hours but it will be readily apparent that other combinations of temperatures and time may be used in order to accomplish the same purpose and without departing from the scope of this invention.

While the annealing of the wires or rods, as set forth hereinbefore, serves to eliminate the effects of the pickling operation, the annealing process tends to accentuate the effects of the liming operation because of the oxide coating that is formed on the wires or rods as a result of the annealing process. The oxide coating thus formed serves to mechanically hold the lime which is present after the drawing operation and the wires or rods then retain the undesirable effects of the liming operation.

It has been proposed to remove the combined lime and oxide coating by subjecting the electrode to a second pickling process which would be just sufficient to counteract the effects thereof and still not present any of the undesirable effects of the acid bath. While this suggested process is theoretically possible, it is practically undesirable because of the many variable factors therein, as set forth hereinbefore.

In addition to the removal of the oxide film and the residual lime coating, it is desirable to provide the wires or rods with a roughened surface in order to permit the ready adhesion thereto of any of the various arc sustaining fluxes that are well known in the art. If a relatively smooth wire is provided with a flux, there is the attendant difficulty of effecting the retention of the flux during the handling and consumption of the fluxed electrode both before and during the welding operation. It is further desirable to provide a roughened surface in order to permit the ready conduction of welding current to the electrode when a light flux coating is used. For illustration a flux in the form of a powder or a thin liquid may be applied to the surface and will be located in the depressions of the roughened surface while the elevations in the surface will remain bare or may be easily bared by any of the current conducting apparatus such as a nozzle which is customarily used for that purpose.

In order to remove the lime and oxide coating and to roughen the surface of the wires or rods to prepare them for further steps in the process of manufacture, I subject the wires or rods to a blast of finely divided particles which are propelled with such force as to cause slight depressions in the surface but which do not tend to remain on the surface. The collision of the finely divided particles with the wires or rods serves also to cut away and remove the oxide film and lime coating which still remain after the annealing operation.

I have found that it is desirable to use a blast of shot composed of small steel balls or the like which may be repeatedly carried by a stream of compressed air to effect the desired cleaning and roughening operation. The wires or rods may be subjected to a shot blast of proper density for a sufficiently long period to cover the surface thereof with a series of overlapping depressions thereby simultaneously effecting the removal of the oxide film and lime coating and providing the desired roughened surface.

For certain types of welding it is desirable to use the wires or rods in the form provided after subjecting them to the shot blasting operation. For other types of welding it is desirable to provide a flux coating on the cleaned and roughened surface which serves to increase the effectiveness of the welding operation.

Any of the well known types of fluxes may be placed on the wires or rods prepared in accordance with this invention and it will be readily apparent that any of the methods of application such as dipping, dusting or extruding the flux may be used to advantage. The wires or rods thus prepared for the reception of the flux are reduced to the normal state of the wires or rods in which condition it is only necessary to take into consideration the composition of the wire itself without necessitating the further consideration of the variable factors hereinbefore mentioned.

As set forth hereinbefore, a light flux of either the dust or liquid type may be applied to the wires or rods which have been annealed and cleaned and roughened by the shot blasting process. Because of the relative roughness of the surface, a sufficient quantity of the flux remains to provide the desired welding and arc stabilizing characteristics and also sufficient contact area is provided whereby current for performing the welding operation may be introduced into the electrode.

In the event that the heavier fluxes are used, the roughened surface permits their more ready adhesion than is available when the customary smooth base metal electrode is used. As a result, there is a considerable decrease in the tendency for the flux to flake off from the electrode and therefore certain of the binding agents, which have previously been used, may be decreased in amount or omitted altogether.

Since certain further changes may be made in the above described embodiment of the invention without departing from the scope thereof, it is intended that all matter contained in the above description shall be interpreted as illustrative and not in a limiting sense.

I claim as my invention:

1. The method of making a metallic welding electrode which consists in annealing the electrode and subsequently subjecting the electrode to a shot blasting operation whereby the exposed surface thereof is simultaneously cleaned and roughened.

2. The method of making a metallic welding electrode which consists in annealing the metallic core of the electrode, subjecting the core to a shot blasting operation whereby the exposed surface thereof is simultaneously cleaned and roughened, and subsequently applying a welding flux to the cleaned and roughened surface.

DAVID L. MATHIAS.